US012809803B2

(12) United States Patent
Li et al.

(10) Patent No.: US 12,809,803 B2
(45) Date of Patent: Nov. 24, 2026

(54) DATA TRANSMISSION METHOD AND APPARATUS, ELECTRONIC DEVICE AND NON-VOLATILE READABLE STORAGE MEDIUM

(71) Applicant: IEIT SYSTEMS CO., LTD., Jinan (CN)

(72) Inventors: Hui Li, Jinan (CN); Changfei Li, Jinan (CN); Shuai Zhao, Jinan (CN); Qinglin Liu, Jinan (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 81 days.

(21) Appl. No.: 18/858,640

(22) PCT Filed: Jun. 19, 2023

(86) PCT No.: PCT/CN2023/101164
§ 371 (c)(1),
(2) Date: Oct. 21, 2024

(87) PCT Pub. No.: WO2024/103720
PCT Pub. Date: May 23, 2024

(65) Prior Publication Data
US 2025/0272256 A1 Aug. 28, 2025

(30) Foreign Application Priority Data
Nov. 16, 2022 (CN) ......................... 202211459291.1

(51) Int. Cl.
*G06F 13/28* (2006.01)

(52) U.S. Cl.
CPC .................................... *G06F 13/28* (2013.01)

(58) Field of Classification Search
CPC ....................................................... G06F 13/28
See application file for complete search history.

(56) References Cited

U.S. PATENT DOCUMENTS 6,832,279 B1 * 12/2004 Potter ................. G06F 13/1621 710/52
2007/0204074 A1 * 8/2007 Ishida ..................... G06F 13/28 710/22

(Continued)

FOREIGN PATENT DOCUMENTS

CN 101030182 A 9/2007
CN 101634975 A 1/2010

(Continued)

OTHER PUBLICATIONS

International Search Report and Written Opinion received for PCT Application No. PCT/CN2023/101164 on Aug. 23, 2023, 10 pgs.

(Continued)

*Primary Examiner* — Henry Tsai
*Assistant Examiner* — Harry Z Wang
(74) *Attorney, Agent, or Firm* — Merchant & Gould P.C.; Daniel J. Pereira

(57) ABSTRACT

The present disclosure discloses a data transmission method and apparatus, an electronic device, and a non-volatile readable storage medium, and relates to the field of data transmission. The method includes: receiving a transmission request; obtaining the target data block from the source address, and dividing the target data block into a plurality of data sub-blocks according to the length of the target data block; and distributing the plurality of the data sub-blocks to a plurality of direct memory access (DMA) engines, so that each of the DMA engines respectively transmits corresponding one or more data sub-blocks to the target address to complete transmission of the target data block.

17 Claims, 3 Drawing Sheets

(56) References Cited

U.S. PATENT DOCUMENTS

| | | | | |
|---|---|---|---|---|
| 2007/0226382 | A1 | 9/2007 | Chiu | |
| 2008/0267066 | A1 | 10/2008 | Archer | |
| 2009/0254683 | A1* | 10/2009 | Camer | H04N 21/47 710/23 |
| 2017/0170905 | A1* | 6/2017 | Tanaka | G06F 13/4068 |
| 2018/0300634 | A1* | 10/2018 | McBride | G06F 9/5033 |

FOREIGN PATENT DOCUMENTS

| | | | |
|---|---|---|---|
| CN | 102193886 | A | 9/2011 |
| CN | 103714027 | A | 4/2014 |
| CN | 109471816 | A | 3/2019 |
| CN | 112765059 | A | 5/2021 |
| CN | 113434441 | A | 9/2021 |
| CN | 115658571 | A | 1/2023 |
| KR | 20150120027 | A | 10/2015 |
| WO | 2024103720 | A1 | 5/2024 |

OTHER PUBLICATIONS

Chinese Search Report received for CN Application No. 2022114592911 on Nov. 16, 2022, 2 pgs.

* cited by examiner

DATA TRANSMISSION METHOD AND APPARATUS, ELECTRONIC DEVICE AND NON-VOLATILE READABLE STORAGE MEDIUM

CROSS-REFERENCE TO RELATED APPLICATION

The present application is a National Stage Application of PCT International Application No.: PCT/CN2023/101164 filed on Jun. 19, 2023, which claims priority to Chinese Patent Application 202211459291.1, filed in the China National Intellectual Property Administration on Nov. 16, 2022, the disclosure of which is incorporated herein by reference in its entirety.

TECHNICAL FIELD

The present disclosure relates to the field of data transmission, and in particular, to a data transmission method and apparatus, an electronic device, and a non-volatile readable storage medium.

BACKGROUND

The field of communications of computer systems includes a high-speed communication method based on a peripheral component interconnect express (PCIE) link, which has developed from PCIE 3.0 to PCIE 5.0. The communication capability of a transmission link is greatly improved. With the improvement of channel performance, the data transmission performance of a single direct memory access (DMA) engine gradually reaches a bottleneck. At this time, to achieve better link communication capability, the DMA engine needs to be accelerated. An existing method for accelerating the DMA engine is as follows: For manufacturers, improve the transfer capability of the DMA engine among hardware during production to achieve the acceleration of the DMA engine. However, the space for improving the transfer capability of the DMA engine among the hardware is limited and the difficulty of improvement is high. In addition, the transfer capability of the DMA engine among the hardware that has been already produced cannot be changed. Therefore, in the related technology, when a large amount of data is transmitted by a computer system and the transmission performance of a single DMA engine reaches a bottleneck, there is a problem of low data transmission capability of the system.

SUMMARY

The present disclosure aims to provide a data transmission method and apparatus, an electronic device, and a non-volatile readable storage medium. A target data block is divided, and the same target data block is processed by using a plurality of DMA engines at the same time, thereby increasing the speed of processing the target data block, and improving the data transmission capability of a server.

In a first aspect of the present disclosure, to solve the above technical problems, the present disclosure provides a data transmission method. The method includes:

receiving a transmission request, wherein the transmission request includes a source address of a target data block, a target address of a target data block, and a length of the target data block;

obtaining the target data block from the source address, and dividing the target data block into a plurality of data sub-blocks according to the length of the target data block; and distributing the plurality of the data sub-blocks to a plurality of direct memory access (DMA) engines, so that each of the DMA engines respectively transmits corresponding one or more data sub-blocks to the target address to complete transmission of the target data block.

Optionally, in a case that the transmission request comprises a plurality of transmission requests, after the receiving a transmission request, the method further includes:

sorting the plurality of the transmission requests in chronological order; and processing each of the transmission requests according to a sorting order.

Optionally, the sorting the plurality of the transmission requests in chronological order includes:

Respectively writing the plurality of the transmission requests into a request queue in chronological order, the request queue following a first-in first-out rule; and the processing each of the transmission requests according to a sorting order includes:

Respectively processing each of the transmission requests according to an order of writing the transmission requests into the request queue.

Optionally, after the distributing the plurality of the data sub-blocks to a plurality of DMA engines, so that each of the DMA engines respectively transmits corresponding one or more data sub-blocks to the target address to complete transmission of the target data block, the method further includes:

determining whether the plurality of the DMA engines complete the transmission of the target data block; and in a case that the plurality of the DMA engines complete the transmission of the target data block, executing a step of obtaining a next transmission request from the request queue.

Optionally, after the determining whether the plurality of the DMA engines complete the transmission of the target data block, the method further includes:

in a case that the plurality of DMA engines do not complete the transmission of the target data block, prohibiting the obtaining the next transmission request from the request queue.

Optionally, the respectively writing the plurality of the transmission requests into a request queue in chronological order, the request queue following a first-in first-out rule includes:

Respectively writing, by using an application program, the plurality of the transmission requests into the request queue in chronological order through a manner of single-thread accessing, wherein the request queue is configured to isolate the application program from the DMA engines, and the application program is configured to perform the single-thread accessing on the DMA engines through the request queue.

Optionally, the respectively writing the plurality of the transmission requests into a request queue in chronological order includes:

when a current transmission request is written into the request queue, determining whether the request queue is in a locked state;

in a case that the request queue is in the locked state, determining that the request queue is in an accessed state, and writing the current transmission request into the request queue after waiting a preset time until the request queue is in an idle state; and in a case that the request queue is in an unlocked state, determining that the request queue is in the idle state, directly writing the current transmission request into the request queue.

Optionally, after the receiving a transmission request, the method further includes:

determining whether the transmission request has a priority level;

in a case that the transmission request has a priority level, determining a first target address corresponding to the transmission request having the priority level;

Respectively inquiring each of the transmission requests from a tail to a head of the request queue, and determining whether second target addresses respectively corresponding to each of the transmission requests overlap with the first target address;

in a case that the second target addresses respectively corresponding to each of the transmission requests overlap with the first target address, stopping the inquiry; and when the transmission request corresponding to the first target address is written into the request queue, writing the transmission request corresponding to the first target address behind the transmission request corresponding to the second target address overlapping with the first target address, as a next transmission request of the transmission request corresponding to the second target address.

Optionally, the respectively inquiring each of the transmission requests from a tail to a head of the request queue, and determining whether second target addresses respectively corresponding to each of the transmission requests overlap with the first target address includes:

comparing the first target address with the second target address corresponding to each of the transmission requests in the request queue;

in a case that the request queue includes the second target address that is consistent with the first target address, determining that the second target addresses respectively corresponding to each of the transmission requests overlap with the first target address; and in a case that the request queue does not include the second target address that is consistent with the first target address, determining that the second target addresses respectively corresponding to each of the transmission requests do not overlap with the first target address.

Optionally, after the determining whether second target addresses respectively corresponding to each of the transmission requests overlap with the first target address, the method further includes:

in a case that the second target addresses respectively corresponding to each of the transmission requests do not overlap with the first target address, writing the transmission request corresponding to the first target address into the head of the request queue.

Optionally, during obtaining a transmission request from the request queue, the method further includes:

determining whether the obtained transmission request has a priority level; and in a case that the obtained transmission request has a priority level, transmitting a target data block corresponding to the transmission request having the priority level by using preset DMA engines.

Optionally, before the transmitting a target data block corresponding to the transmission request having the priority level by using preset DMA engines, the method further includes:

in a case that a number of the plurality of DMA engines currently allowed to be used is greater than a target number threshold, setting one or more of the DMA engines, currently allowed to be used, as the preset DMA engines.

Optionally, the dividing the target data block into a plurality of data sub-blocks according to the length of the target data block includes:

dividing the target data block into the plurality of the data sub-blocks according to the length of the target data block and an optimal data transmission length of a DMA engine, wherein a data length of each data sub-block is not greater than the optimal data transmission length of each DMA engine.

Optionally, transmission efficiency of the DMA engine during transmission of a data block with a data length not greater than the optimal data transmission length is higher than target transmission efficiency.

Optionally, the dividing the target data block into the plurality of data sub-blocks according to the length of the target data block and an optimal data transmission length of a DMA engines includes:

averagely dividing the target data block into the plurality of the data sub-blocks with an equal data block length according to the length of the target data block and the optimal data transmission lengths of the DMA engine.

Optionally, the distributing the plurality of the data sub-blocks to a plurality of the DMA engines includes:

averagely distributing the plurality of the data sub-blocks to the plurality of the DMA engines.

Optionally, in a case that each DMA engine corresponds to more than one of the data sub-blocks, the method further includes:

Respectively controlling the DMA engine to transmit the data sub-blocks corresponding to the DMA engine according to an order.

In a second aspect of the present disclosure, to solve the above technical problems, the present disclosure further provides a data transmission apparatus. The apparatus includes:

a request receiving unit, configured to receive a transmission request, wherein the transmission request includes a source address of a target data block, a target address of a target data block, and a length of the target data block;

a division unit, configured to: obtain the target data block from the source address, and divide the target data block into a plurality of data sub-blocks according to the length of the target data block; and a distribution unit, configured to distribute the plurality of the data sub-blocks to a plurality of DMA engines, so that each of the DMA engines respectively transmits corresponding one or more data sub-blocks to the target address to complete transmission of the target data block.

In a third aspect of the present disclosure, to solve the above technical problems, the present disclosure further provides an electronic device, including:

a memory, configured to store a computer program; and a processor, configured to implement, when run the computer program, the steps of the data transmission method as described above.

In a fourth aspect of the present disclosure, to solve the above technical problems, the present disclosure further provides a non-volatile readable storage medium, having a computer program stored thereon, wherein the computer program, when run by a processor, implements the steps of the data transmission method as described above.

The present disclosure provides a data transmission method, and relates to the field of data transmission. In the solution, the method includes: receiving a transmission request, wherein the transmission request includes a source address of a target date block, a target address of a target date block, and a length of the target data block; obtaining the target data block from the source address, and dividing the target data block into a plurality of data sub-blocks according to the length of the target data block; and distributing the plurality of the data sub-blocks to a plurality of DMA engines, so that each of the DMA engines respectively transmits corresponding one or more data sub-blocks to the target address to complete transmission of the target data block. According to the method in the present disclosure, dividing the target data block, and processing the same target data block by using the plurality of DMA engines at the same time, thereby increasing the speed of processing the target data block, and improving the data transmission capability of a server.

The present disclosure further provides a data transmission apparatus, an electronic device, and a non-volatile readable storage medium, all of which have the same beneficial effects as the data transmission method described above.

BRIEF DESCRIPTION OF THE DRAWINGS

For clearer descriptions of the technical solutions according to the embodiments of the present disclosure, the drawings required to be used in the prior art and the embodiments are briefly introduced below. It is obvious that the drawings in the description below are only some embodiments of the present disclosure, and it is obvious for those skilled in the art that other drawings can be acquired according to the drawings without creative efforts.

DETAILED DESCRIPTION OF THE EMBODIMENTS

The key of the present disclosure is to provide a data transmission method and apparatus, an electronic device, and a non-volatile readable storage medium. A target data block is divided, and the same target data block is processed by using a plurality of DMA engines at the same time, thereby increasing the speed of processing the target data block, and improving the data transmission capability of a server.

To make the objectives, technical solutions, and advantages of the embodiments of the present disclosure clearer, the technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

Figure 1:
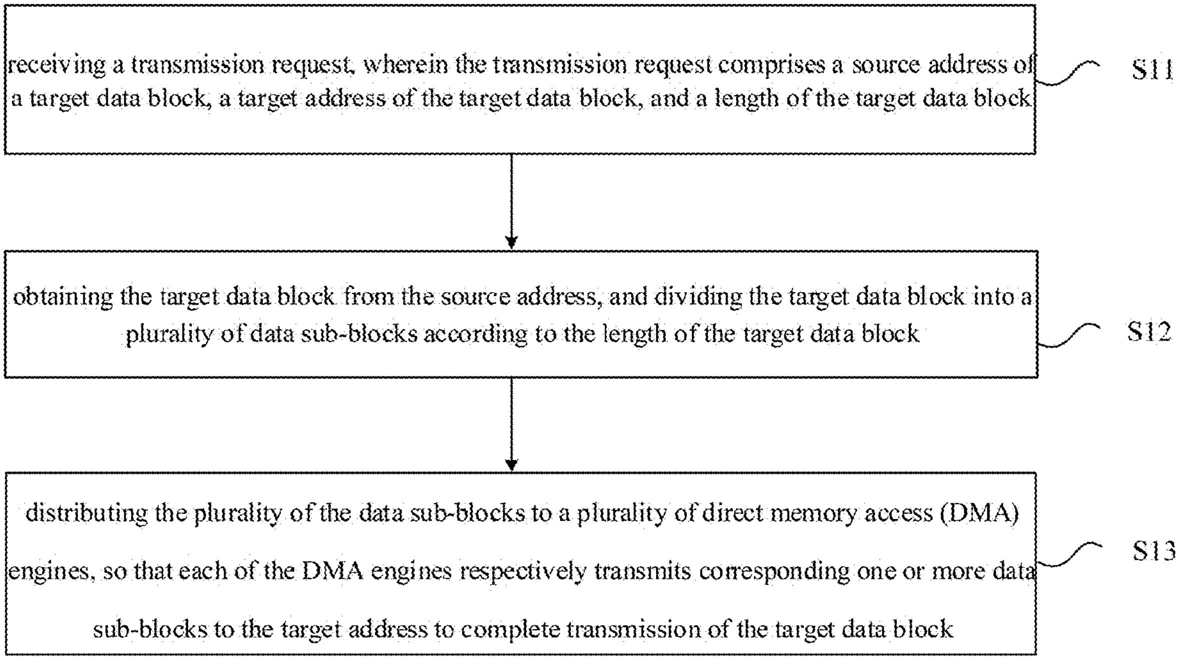
FIG. 1 is a flowchart of a data transmission method according to the present disclosure.

Referring to FIG. 1, FIG. 1 is a flowchart of a data transmission method according to the present disclosure. The method is applied to a server including a plurality of DMA engines. The method includes:

S11: Receiving a transmission request, wherein the transmission request comprises a source address of a target data block, a target address of the target data block, and a length of the target data block.

Figure 2:
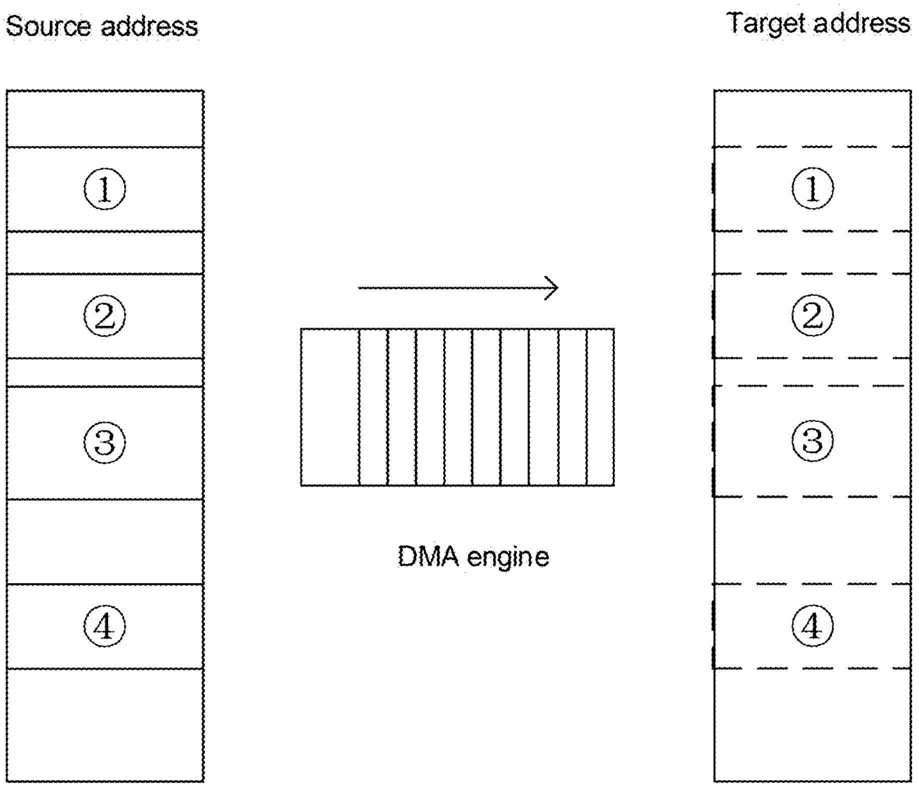
FIG. 2 is a diagram of a working principle of a DMA engine according to the present disclosure.

A working principle of the DMA engines will be first briefly introduced. Referring to FIG. 2, FIG. 2 is a diagram of a working principle of a DMA engine according to the present disclosure. A transmission request sent by an application program includes source addresses, target address, and data block sizes of data blocks 1, 2, 3, and 4, and the data blocks are submitted to the DMA engine. The DMA engine is started to move the four data blocks from the source addresses to the corresponding target addresses in sequence.

S12: Obtaining the target data block from the source address, and dividing the target data block into a plurality of data sub-blocks according to the length of the target data block.

Figure 3:
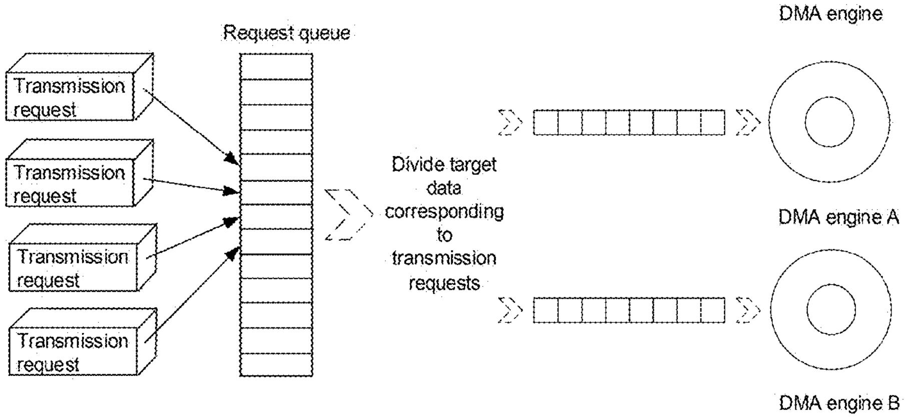
FIG. 3 is a flowchart of another data transmission method according to the present disclosure.

Optionally, referring to FIG. 3, FIG. 3 is a flowchart of another data transmission method according to the present disclosure. If a large amount of data needs to be transmitted at a moment in the server, the transfer capability of a single DMA engine may reach a bottleneck. At this time, transmission of data cannot be completed.

To solve this problem, in the present disclosure, when the transmission request is received, the target data block corresponding to the transmission request is divided into the plurality of data sub-blocks with small lengths for distribution to a plurality of DMA engines, so that the DMA engines can jointly complete the transmission of the target data block. This improves the efficiency of data transmission.

S13: Distributing the plurality of the data sub-blocks to a plurality of direct memory access (DMA) engines, so that each of the DMA engines respectively transmits corresponding one or more data sub-blocks to the target address to complete transmission of the target data block.

After distributing the plurality of the data sub-blocks to the plurality of DMA engines, each of DMA engine respectively transmits corresponding one or more data sub-block from the source address to the target address, thereby achieving the transmission of the target data block.

As an optional embodiment, the target data block is divided into a plurality of data sub-blocks according to the length of the target data block, which includes:

The target data block is divided into the plurality of the data sub-blocks according to the length of the target data block and an optimal data transmission length of a DMA engine, wherein a data length of each data sub-block is not greater than the optimal data transmission length of each DMA engine.

This embodiment aims to define an optional implementation of dividing the target data block. Optionally, in general, each DMA engine corresponds to an optimal data transmission length of its transmission. Correspondingly, the transmission efficiency of the DMA engine during transmission of a data block with a data length not greater than the optimal data transmission length is high. Therefore, in the present disclosure, to divide the target data block, the target data lock is divided into the plurality of data sub-blocks according to the length of the target data block and the optimal data transmission length of the DMA engine, ensuring that the length of each data sub-block is not greater than the optimal data transmission length of the DMA engine, to ensure the transmission efficiency of the DMA engine.

It should be noted that the optimal data transmission lengths corresponding to the plurality of DMA engines in the same server are usually the same, but they can be set to be different. The present disclosure does not make any special limitations here.

As an optional embodiment, the target data block is divided into the plurality of data sub-blocks according to the length of the target data block and an optimal data transmission length of a DMA engines, which includes:

The target data block is averagely divided into the plurality of the data sub-blocks with an equal data block lengths according to the length of the target data block and the optimal data transmission lengths of the DMA engines.

Optionally, this embodiment considers the load balancing principle. During the division of the target data block into the data sub-blocks, the lengths of the plurality of data sub-blocks are set to be the same. When the data sub-blocks are distributed to the various DMA engines, the lengths and sizes of the data blocks received by the DMA engines can be made to be the same to an extent, thereby achieving a load balance as much as possible and enabling the plurality of DMA engines to work synchronously as much as possible.

As an optional embodiment, the plurality of the data sub-blocks are distributed to a plurality of DMA engines, which includes:

Averagely distributing the plurality of the data sub-blocks to the plurality of the DMA engines.

Optionally, in this embodiment, it is defined that when distributing the data sub-blocks to the DMA engines, the data sub-blocks should be evenly distributed among the plurality of DMA engines to ensure load balancing between them, and enabling the plurality of DMA engines to work synchronously as much as possible.

As an optional embodiment, in a case that each DMA engine corresponds to more than one of the data sub-blocks, the method further includes:

respectively controlling the DMA engine to transmit the data sub-blocks corresponding to the DMA engine according to an order.

Optionally, after dividing the target data block, if each DMA engine corresponds to more than one data sub-block, correspondingly, to ensure the correctness of data in each target address, in the present disclosure, when the various DMA engines process their corresponding one or more data sub-blocks, it needs to ensure that each DMA respectively process the various data sub-blocks in sequence according to the order.

For example, if the length (i.e. size) of a target data block is 16 K and there are two DMA engines, the optimal data transmission length corresponding to each DMA engine is 4 k. At this time, during the division of the target data block, the target data block is divided into four data sub-blocks with a data length of 4 k, and two data sub-blocks are distributed to each DMA engine. Each DMA engine transmits the two data sub-blocks corresponding to the DMA engine itself in sequence according to an order. This can be: After the transmission of the first data sub-block is completed, he second data sub-block is then transmitted.

As an optional embodiment, in a case that the transmission request comprises a plurality of transmission requests, after receiving a transmission request, the method further includes:

sorting the plurality of the transmission requests in chronological order; and processing each of the transmission requests according to a sorting order.

Optionally, when there are a plurality of transmission requests, there may be a situation that a plurality of DMA engines write the same target address. This may cause corruption of data in the target address.

Therefore, when there are a plurality of transmission requests, in the present disclosure, the transmission requests need to be sorted in chronological order and are then processed in sequence according to the corresponding sorting order, to ensure that the DMA engines only process one transmission request at the same moment. Namely, only one write operation is performed on the same target address at the same moment, which can avoid corruption of data in the target address.

As an optional embodiment, the sorting the plurality of the transmission requests in chronological order, which includes:

Respectively writing the plurality of the transmission requests into a request queue in chronological order, the request queue following a first-in first-out rule; and the processing each of the transmission requests according to a sorting order, which includes:

respectively processing each of the transmission requests according to an order of writing the transmission requests into the request queue.

This embodiment aims to define an optional implementation of sorting the various transmission requests. Optionally, in the present disclosure, the request queue is used to sort the various transmission requests, and the plurality of transmission requests are written into the request queue in sequence in chronological order. Since the request queue in the present disclosure follows the first-in first-out rule, during the obtaining of the various transmission requests from the request queue, the various transmission requests can only be processed from the request queue in chronological order (i.e. the order of writing into the queue).

It can be seen that the method in the present disclosure can prevent the corruption of the data in the target address.

As an optional embodiment, after the distributing the plurality of the data sub-blocks to a plurality of DMA engines, so that each of the DMA engines respectively transmits corresponding one or more data sub-blocks to the target address to complete transmission of the target data block, the method further includes:

Determining whether the plurality of the DMA engines complete the transmission of the target data block; and in a case that the plurality of the DMA engines complete the transmission of the target data block, executing a step of obtaining a next transmission request from the request queue.

Optionally, to ensure that the DMA engines only process the target data block corresponding to one transmission request at each time, and to avoid the problem of the corruption of data caused by the DMA engines simultaneously write the same target address during the processing of the plurality of transmission requests, in the present disclosure, when the DMA engines transmit the target data block corresponding to the current transmission request, whether the transmission of the current target data block is completed will be determined. If the transmission is not completed, it indicates that the DMA engines are currently in a state of transmitting the target data block corresponding to the current transmission request. If a next transmission request is directly obtained from the request queue, the target address corresponding to the next transmission request may overlap with the target address corresponding to the current transmission request (i.e. there may be repeated addresses). At this time, the DMA engines may simultaneously write data to the same address, which may cause corruption of data corresponding to the overlapping addresses. Therefore, in the present disclosure, when it is determined that the transmission of the target data block is completed, it indicates that the DMA engine has completed the process of transmitting the current target data block. Namely, it indicates that the DMA engines are in an idle state. At this time, when the next transmission request is processed, the situation of target address overlapping can be avoided, thus avoiding corruption of data.

Optionally, the process of sending a transmission request by an application program is a single-thread access to the DMA engines. If a plurality of threads simultaneously access the DMA engines, there may be a competition problem caused by simultaneous calling of the DMA engines to transfer data.

Therefore, in the present disclosure, a request queue is set between the application program (i.e. the threads) and the DMA engines. This request queue can isolate the application program from the DMA engines, so that the application program cannot directly access the DMA engines and needs to access the DMA engines through the request queue. The request queue can sort the various transmission requests, thereby avoiding the competition caused by the simultaneous calling of the DMA engines by the plurality of threads.

As an optional embodiment, the respectively writing the plurality of the transmission requests into a request queue in chronological order, which includes:

When a current transmission request is written into the request queue, whether the request queue is in a locked state is determined;

in a case that the request queue is in the locked state, determining that the request queue is in an accessed state, and writing the current transmission request into the request queue after waiting a preset time until the request queue is in an idle state; and in a case that the request queue is in an unlocked state, it is determined that the request queue is in the idle state, and the current transmission request is directly written into the request queue.

Optionally, if there are a plurality of threads simultaneously write a plurality of transmission requests into the request queue, and there is overlapping between the target addresses corresponding to the plurality of transmission requests, data errors in the overlapping addresses may be caused.

To avoid the above problems, in the present disclosure, when the transmission request is written into the request queue, whether the request queue is in a locked state needs to be determined. Optionally, the request queue is in the locked state when accessed. The request queue is in an unlocked state when not accessed. Therefore, when the current transmission request is written into the request queue, if it is determined that the request queue is in the locked state, it is determined that the request queue is currently being accessed. Namely, in a process of writing a transmission request into the request queue, it is not allowed to write another transmission request into the request queue. The current transmission request can be only written into the request queue until the process of writing the previous transmission request into the request queue is completed, namely, until the request queue is in the idle state. If it is determined that the request queue is in the unlocked state when the current transmission request is written into the request queue, it is determined that the request queue is not currently being accessed, namely, the request queue is in the idle state. At this time, the transmission request can be directly written into the request queue, and there will be no overlapping among the target addresses.

In summary, through the method in the present disclosure, the order of the various transmission requests can be ensured, and overlapping target addresses can be read, written, and accessed sequentially. This means that only one thread accesses the request queue at the same moment, which means that only one transmission request is allowed to be written into the request queue at the same moment. This can avoid data errors corresponding to the overlapping parts of the target addresses.

As an optional embodiment, after a transmission request is received, the method further includes:

Whether the transmission request has a priority level is determined;

in a case that the transmission request has a priority level, a first target address corresponding to the transmission request having the priority level is determined;

Each of transmission requests are respectively inquired from a tail to a head of the request queue, and whether second target addresses respectively corresponding to each of the transmission requests overlap with the first target address is determined;

in a case that the second target addresses respectively corresponding to each of the transmission requests overlap with the first target address, the inquiry is stopped; and when the transmission request corresponding to the first target address is written into the request queue, the transmission request corresponding to the first target address is written behind the transmission request corresponding to the overlapping second target address overlapping with the first target address, as a next transmission request of the transmission request corresponding to the second target address.

Optionally, during the transmission of the target data block, there may still be some target data blocks with high priority levels (for example, a priority level is preset for the target data block). In this case, based on the above request queue that has been already used, how to use the request queue to ensure transmission of a target data block with a high priority level is the problem to be solved in the present disclosure.

Optionally, first, after the above step: receiving a transmission request, whether the transmission request has a priority level needs to be determined. If the transmission request has a priority level, it is determined that the target data block corresponding to the transmission request is a target data block with a high priority level. After it is determined that the transmission request has the priority level, a first target address corresponding to the transmission request is obtained, and the first target address is compared with second target addresses corresponding to each of the transmission requests in the request queue (the comparison is performed from the tail to the head one by one), to determine whether the second target addresses corresponding to the transmission requests overlap with the first target address. If there is overlapping, it means that the overlapping address needs to be written at least twice and in order. Namely, the transmission request corresponding to the second target address needs to be written into the address once, and the transmission request corresponding to the first target address needs to be written into the address once. Therefore, even if the priority level of the transmission request corresponding to the first target address is higher, the priority level cannot be higher than that of the transmission request corresponding to the second target address that overlaps with the first target address, otherwise it will cause data errors in the overlapping target addresses. Therefore, when the transmission request corresponding to the first target address is written into the request queue, the transmission request can only be written behind the transmission request corresponding to the second target address, to ensure security of data and avoid corruption of data.

It should be noted that the transmission request corresponding to the second target address in the present disclosure is the first transmission request that overlaps with the first target address and is found from the tail to the head of the request queue. Once the transmission request corresponding to the first target address is found, the inquiry is stopped. Regardless of whether the target address corresponding to the transmission request in front of this transmission request overlaps with the first target address, the transmission request corresponding to the second target address needs to be written into the overlapping addresses once. In addition, stopping the inquiry can also reduce the power consumption of a process to an extent.

As an optional embodiment, after the determining whether second target addresses respectively corresponding to each of the transmission requests overlap with the first target address, the method further includes:

- in a case that the second target addresses respectively corresponding to each of the transmission requests do not overlap with the first target address, writing the transmission request corresponding to the first target address into the head of the request queue.

Optionally, if no transmission request that overlaps with the first target address is found from the tail to the head of the request queue, it indicates that the request queue does not contain a transmission request that conflicts with the transmission request corresponding to the first target address (i.e. there is no transmission request which a target address corresponding to overlap with the first target address). At this point, the transmission request corresponding to the first target address can be written into the head of the request queue, so that this transmission request can be processed earlier, which will not cause corruption of data in the various addresses.

As an optional embodiment, during the obtaining a transmission request from the request queue, the method further includes:

- Whether the obtained transmission request has a priority level is determined; and
- in a case that the obtained transmission request has a priority level, a target data block corresponding to the transmission request having the priority level is transmitted by using preset DMA engines.

Optionally, when the number of DMA engines in the server is sufficient, separate preset DMA engines can be configured for transmission requests with priority levels. The preset DMA engines are only responsible for transmitting the transmission requests with the priority levels.

Optionally, when the above transmission request has a priority level, the transmission request is written into the request queue. After this, when a transmission request is obtained from the request queue for processing, whether the transmission request is a transmission request having a priority level needs to be determined. If yes, the preset DMA engine is used to process the transmission request having the priority level. This means that the target data block corresponding to the transmission request having the priority level is transmitted by using the preset DMA engine.

If the number of DMA engines in the server is relatively insufficient, that is, when the number of DMA engines is small, when a transmission request having a priority level is obtained from the request queue, the transmission request can be processed according to the above conventional steps.

In summary, according to the method in the present disclosure, the target data block is divided, and the same target data block is processed by using the plurality of DMA engines at the same time, so that the speed of processing the target data block can be increased, and the data transmission capability of a server is improved.

Figure 4:
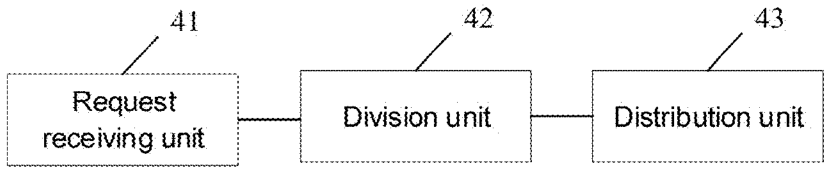
FIG. 4 is a structural block diagram of a data transmission apparatus according to the present disclosure.

To solve the above technical problems, the present disclosure further provides a data transmission apparatus. Referring to FIG. 4, FIG. 4 is a structural block diagram of a data transmission apparatus according to the present disclosure. The apparatus includes:

- a request receiving unit 41, configured to receive a transmission request, wherein the transmission request includes a source address of a target data block, a target address of a target data block, and a length of the target data block;
- a division unit 42, configured to: obtain the target data block from the source address, and divide the target data block into a plurality of data sub-blocks according to the length of the target data block; and
- a distribution unit 43, configured to distribute the plurality of the data sub-blocks to a plurality of DMA engines, so that each of the various DMA engines respectively transmits corresponding one or more data sub-blocks to the target address to complete transmission of the target data block.

As an optional embodiment, the apparatus further includes:

- a sorting unit, configured to sort the plurality of the transmission requests in chronological order; and
- a sequential processing unit, configured to process each of the transmission requests according to a sorting order.

As an optional embodiment, the sorting unit can be configured to respectively write the plurality of the transmission requests into a request queue in chronological order, the request queue following a first-in first-out rule; and

- the sequential processing unit can be configured to respectively process each of the transmission requests according to an order of writing the transmission requests into the request queue.

As an optional embodiment, the apparatus further includes:

- a first determining unit, configured to: determine whether the plurality of DMA engines complete the transmission of the target data block; and in a case that the plurality of the DMA engines complete the transmission of the target data block, execute a step of obtaining a next transmission request from the request queue. As an optional embodiment, the sequential processing unit includes:
- a second determining unit, configured to: when a current transmission request is written into the request queue, determine whether the request queue is in a locked state;

a first execution unit, configured to: in a case that the request queue is in the locked state, determine that the request queue is in an accessed state, and write the current transmission request into the request queue after waiting a preset time until the request queue is in an idle state; and a second execution unit, configured to: in a case that the request queue is in an unlocked state, determine that the request queue is in the idle state, and directly write the current transmission request into the request queue.

As an optional embodiment, the apparatus further includes:

a third determining unit, configured to determine whether the transmission request has a priority level;

a third execution unit, configured to: in a case that the transmission request has a priority level, determine a first target address corresponding to the transmission request having the priority level;

a fourth determining unit, configured to: respectively inquire each of the transmission requests from a tail to a head of the request queue, and determine whether second target addresses respectively corresponding to each of the transmission requests overlap with the first target address; and a fourth execution unit, configured to: in a case that the second target addresses respectively corresponding to each of the transmission requests overlap with the first target address, stop the inquiry; and when the transmission request corresponding to the first target address is written into the request queue, write the transmission request corresponding to the first target address behind the transmission request corresponding to the overlapping second target address overlapping with the first target address, as a next transmission request of the transmission request corresponding to the second target address.

As an optional embodiment, the apparatus further includes:

a fifth execution unit, configured to: in a case that the second target addresses respectively corresponding to each of the transmission requests do not overlap with the first target address, write the transmission request corresponding to the first target address into the head of the request queue.

As an optional embodiment, during obtaining a transmission request from the request queue, the apparatus further includes:

a fifth determining unit, configured to determine whether the obtained transmission request has a priority level; and a sixth execution unit, configured to: in a case that the obtained transmission request has a priority level, transmit a target data block corresponding to the transmission request having the priority level by using preset DMA engines.

As an optional embodiment, the division unit can be configured to divide the target data block into the plurality of the data sub-blocks according to the length of the target data block and an optimal data transmission length of a DMA engines, wherein a data length of each data sub-block is not greater than the optimal data transmission length of each DMA engine.

As an optional embodiment, the division unit can be configured to averagely divide the target data block into the plurality of the data sub-blocks with an equal data block length according to the length of the target data block and the optimal data transmission length of the DMA engine.

As an optional embodiment, the distribution unit can be configured to averagely distribute the plurality of the data sub-blocks to a plurality of the DMA engines.

As an optional embodiment, the apparatus further includes:

a control unit, configured to: when each DMA engine corresponds to more than one of the data sub-blocks, respectively control the DMA engine to transmit the data sub-blocks corresponding to the DMA engine according to an order.

The data transmission apparatus is introduced with reference to the above embodiments. The present disclosure will not elaborate this.

Figure 5:
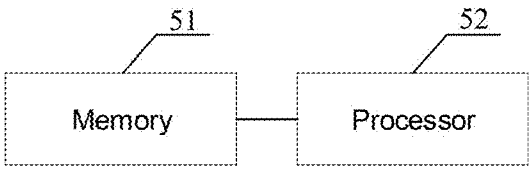
FIG. 5 is a structural block diagram of an electronic device according to the present disclosure.

To solve the above technical problems, the present disclosure further provides an electronic device. Referring to FIG. 5, FIG. 5 is a structural block diagram of an electronic device according to the present disclosure. The electronic device includes:

a memory 51, configured to store a computer program; and a processor 52, configured to implement, when run the computer program, the steps of the data transmission method as described above.

The electronic device is introduced with reference to the above embodiments. The present disclosure will not elaborate this.

To solve the above technical problems, the present disclosure further provides a non-volatile readable storage medium, having a computer program stored thereon, wherein the computer program, when run by a processor, implements the steps of the data transmission method as described above. The non-volatile readable storage medium can be a transient storage medium or a non-transient storage medium. The present disclosure does not limit this. The non-volatile readable storage medium is introduced with reference to the above embodiments. The present disclosure will not elaborate this.

It should be noted that in this specification, relationship terms such as first and second are used only to distinguish one entity or operation from another entity or operation without necessarily requiring or implying any actual such relationship or order between these entities or operations. Furthermore, the terms “include”, “including”, or any other variation thereof, are intended to encompass a non-exclusive inclusion, such that a process, method, article, or device that includes a list of elements does not include only those elements but may include other elements not explicitly listed or inherent to such process, method, article, or device. Without more constraints, an element limited by “includes a . . . ” does not preclude the existence of additional identical elements in the process, method, product, or device that includes the element.

The above explanations of the disclosed embodiments enable those skilled in the art to implement or use the present disclosure. The various modifications to these embodiments will be apparent to those skilled in the art, and the general principles defined herein can be implemented in other embodiments without departing from the spirit or scope of the present disclosure. Thus, the present invention is not limited to these embodiments shown herein, but accords with the broadest scope consistent with the principles and novel features disclosed herein.

What is claimed is:

1. A data transmission method, comprising:

receiving a transmission request, wherein the transmission request comprises a source address of a target data block, a target address of the target data block, and a length of the target data block;

obtaining the target data block from the source address, and dividing the target data block into a plurality of data sub-blocks according to the length of the target data block; and distributing the plurality of the data sub-blocks to a plurality of direct memory access (DMA) engines, so that each of the DMA engines respectively transmits corresponding one or more data sub-blocks to the target address to complete transmission of the target data block;

wherein in a case that the transmission request comprises a plurality of transmission requests, after the receiving a transmission request, the method further comprises: sorting the plurality of the transmission requests in chronological order; and processing each of the transmission requests according to a sorting order;

wherein the sorting the plurality of the transmission requests in chronological order comprises: respectively writing the plurality of the transmission requests into a request queue in chronological order, the request queue following a first-in first-out rule; and the processing each of the transmission requests according to a sorting order comprises: respectively processing each of the transmission requests according to an order of writing the transmission requests into the request queue;

wherein the respectively writing the plurality of the transmission requests into a request queue in chronological order, the request queue following a first-in first-out rule comprises: respectively writing, by using an application program, the plurality of the transmission requests into the request queue in chronological order through a manner of single-thread accessing, wherein the request queue is configured to isolate the application program from the DMA engines, and the application program is configured to perform the single-thread accessing on the DMA engines through the request queue.

2. The data transmission method according to claim 1, wherein after the distributing the plurality of the data sub-blocks to a plurality of DMA engines, so that each of the DMA engines respectively transmits corresponding one or more data sub-blocks to the target address to complete transmission of the target data block, the method further comprises:

determining whether the plurality of the DMA engines complete the transmission of the target data block; and in a case that the plurality of the DMA engines complete the transmission of the target data block, executing a step of obtaining a next transmission request from the request queue.

3. The data transmission method according to claim 2, wherein after the determining whether the plurality of the DMA engines complete the transmission of the target data block, the method further comprises:

in a case that the plurality of the DMA engines do not complete the transmission of the target data block, prohibiting the obtaining the next transmission request from the request queue.

4. The data transmission method according to claim 1, wherein the respectively writing the plurality of the transmission requests into a request queue in chronological order comprises:

when a current transmission request is written into the request queue, determining whether the request queue is in a locked state;

in a case that the request queue is in the locked state, determining that the request queue is in an accessed state, and writing the current transmission request into the request queue after waiting a preset time until the request queue is in an idle state; and in a case that the request queue is in an unlocked state, determining that the request queue is in the idle state, directly writing the current transmission request into the request queue.

5. The data transmission method according to claim 1, wherein after the receiving a transmission request, the method further comprises:

determining whether the transmission request has a priority level;

in a case that the transmission request has a priority level, determining a first target address corresponding to the transmission request having the priority level;

respectively inquiring each of the transmission requests from a tail to a head of the request queue, and determining whether second target addresses respectively corresponding to each of the transmission requests overlap with the first target address;

in a case that the second target addresses respectively corresponding to each of the transmission requests overlap with the first target address, stopping the inquiry; and when the transmission request corresponding to the first target address is written into the request queue, writing the transmission request corresponding to the first target address behind the transmission request corresponding to the second target address overlapping with the first target address, as a next transmission request of the transmission request corresponding to the second target address.

6. The data transmission method according to claim 5, wherein the respectively inquiring each of the transmission requests from a tail to a head of the request queue, and determining whether second target addresses respectively corresponding to each of the transmission requests overlap with the first target address comprises:

comparing the first target address with the second target address corresponding to each of the transmission requests in the request queue;

in a case that the request queue comprises the second target address that is consistent with the first target address, determining that the second target addresses respectively corresponding to each of the transmission requests overlap with the first target address; and in a case that the request queue does not comprise the second target address that is consistent with the first target address, determining that the second target addresses respectively corresponding to each of the transmission requests do not overlap with the first target address.

7. The data transmission method according to claim 5, wherein after the determining whether second target addresses respectively corresponding to each of the transmission requests overlap with the first target address, the method further comprises:

in a case that the second target addresses respectively corresponding to each of the transmission requests do not overlap with the first target address, writing the transmission request corresponding to the first target address into the head of the request queue.

8. The data transmission method according to claim 4, wherein during obtaining a transmission request from the request queue, the method further comprises:

determining whether the obtained transmission request has a priority level; and in a case that the obtained transmission request has a priority level, transmitting a target data block corresponding to the transmission request having the priority level by using a preset DMA engine.

9. The data transmission method according to claim 8, wherein before the transmitting a target data block corresponding to the transmission request having the priority level by using a preset DMA engine, the method further comprises:

in a case that a number of the plurality of DMA engines currently allowed to be used is greater than a target number threshold, setting one or more of the DMA engines, currently allowed to be used, as the preset DMA engine.

10. The data transmission method according to claim 1, wherein the dividing the target data block into a plurality of data sub-blocks according to the length of the target data block comprises:

dividing the target data block into the plurality of the data sub-blocks according to the length of the target data block and an optimal data transmission length of a DMA engine, wherein a data length of each data sub-block is not greater than the optimal data transmission length of the DMA engine.

11. The data transmission method according to claim 10, wherein transmission efficiency of the DMA engine during transmission of a data block with a data length not greater than the optimal data transmission length is higher than target transmission efficiency.

12. The data transmission method according to claim 10, wherein the dividing the target data block into the plurality of data sub-blocks according to the length of the target data block and an optimal data transmission length of a DMA engine comprises:

averagely dividing the target data block into the plurality of the data sub-blocks with an equal data block length according to the length of the target data block and the optimal data transmission length of the DMA engine.

13. The data transmission method according to claim 12, wherein the distributing the plurality of the data sub-blocks to a plurality of DMA engines comprises:

averagely distributing the plurality of the data sub-blocks to the plurality of the DMA engines.

14. The data transmission method according to claim 13, wherein in a case that each DMA engine corresponds to more than one of the data sub-blocks, the method further comprises:

respectively controlling the DMA engine to transmit the data sub-blocks corresponding to the DMA engine according to an order.

15. An electronic device, comprising:

a memory, configured to store a computer program; and a processor, configured to implement, when run the computer program, the steps of the data transmission method according to claim 1.

16. A non-transitory readable storage medium, having a computer program stored thereon, wherein the computer program, when run by a processor, implements the steps of the data transmission method according to claim 1.

17. The data transmission method according to claim 1, wherein the dividing the target data block into a plurality of data sub-blocks according to the length of the target data block comprises:

dividing the target data block into the plurality of the data sub-blocks according to the length of the target data block and an optimal data transmission length of a DMA engine, wherein a data length of each data sub-block is not greater than the optimal data transmission length of the DMA engine.

* * * * *